Dec. 8, 1936.                H. BANY ET AL                 2,063,077
                      ELECTRICAL REGULATING SYSTEM
                         Filed April 23, 1935
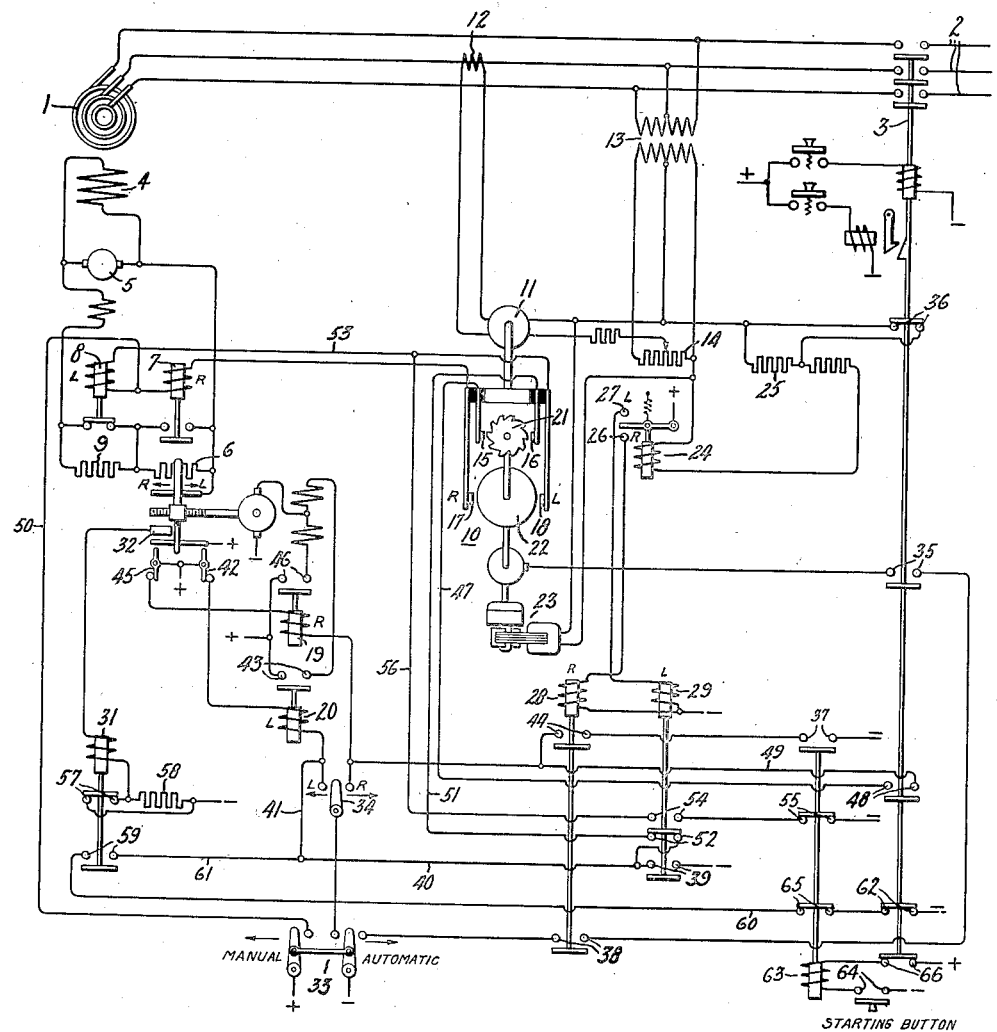
                                        Inventors:
                                        Herman Bany,
                                        Robert N. Slinger,
                                        by Harry E. Dunham
                                           Their Attorney.

Patented Dec. 8, 1936

2,063,077

UNITED STATES PATENT OFFICE 2,063,077

ELECTRICAL REGULATING SYSTEM

Herman Bany, Lansdowne, Pa., and Robert N. Slinger, Schenectady, N. Y., assignors to General Electric Company, a corporation of New York Application April 23, 1935, Serial No. 17,876

6 Claims. (Cl. 171—119)

Our invention relates to automatic electrical regulating systems and more particularly to a novel correlated power factor regulating and voltage control system for alternating current dynamo-electric machines.

It is sometimes desirable to regulate the power factor of certain alternating current dynamo-electric machines, such, for example, as those alternators or synchronous generators which are located in relatively isolated or remotely situated automatic hydro-electric substations which supply power to a transmission or distribution system. This may be done by controlling the machines with a power factor regulator of any suitable type. In such substations it is customary to provide automatic means for synchronizing the generator or generators with the circuit to which it is to supply power. This automatic synchronizing means usually includes automatic means for initially regulating the magnitude of the generator voltage, as well as the frequency of this voltage, for only when these characteristics of the generator voltage correspond to the same characteristics of the circuit to which the generator is to be connected, can the generator safely be connected to the circuit. However the synchronizing means is usually rendered inoperative once its machine has been synchronized and connected to the line. We have found that in such systems dangerous overvoltages sometimes occur after the generator has been synchronized and connected to the power circuit. For example, if the substation or generator should suddenly lose its load the generator prime mover will momentarily speed up and this over-speed combined with the loss of impedance voltage drop in the generator itself, due to the loss of load current, acts to increase the generator terminal voltage. As a power factor regulator only responds to power factor and not the voltage, there is no means, other than the conventional overvoltage protective means which completely shuts down the station, for quickly reducing this overvoltage.

In accordance with our invention we provide a novel correlated power factor regulating and voltage control system including but a single voltage responsive control means which serves to regulate the magnitude of the generator voltage for synchronizing purposes and which also serves as an over-voltage responsive means, after synchronizing has taken place, for quickly reducing the generator voltage in case over-voltage occurs.

It should be understood, however, that our invention is not limited to synchronous generators in automatic substations and that on the contrary it is capable of application to many different kinds of alternating current machines, whether generators or motors when it is desired to regulate power factor and control voltage.

An object of our invention is to provide a new and improved electrical regulating system.

Another object of our invention is to provide a new and improved automatic power factor regulating and voltage control system for a synchronous generator.

Our invention will be better understood from the following description taken in connection with the accompanying drawing and its scope will be pointed out in the appended claims.

Referring now to the single figure of the accompanying drawing, which is a simplified diagrammatic showing of one particular embodiment of our invention, there is shown therein an alternating current dynamo-electric machine 1, which is illustrated by way of example as a three phase synchronous generator. Generator 1 is adapted to be connected to a power circuit 2 by means of a suitable switch or circuit controller 3, which in most practical applications will be an oil circuit breaker. Generator 1 is also preferably provided with a conventional excitation system comprising a direct current field winding 4 energized by a direct current exciter 5 having a reversible pilot motor operated shunt field rheostat 6. Exciter 5 is also provided with a pair of high speed "raise" and "lower" relays, or contactors, 7 and 8, respectively. High speed "raise" contactor 7 has its contacts normally open and is adapted to short circuit the rheostat 6 when it is energized. This produces a relatively sudden and large decrease in the resistance in the shunt field circuit of the exciter 5 whereby the voltage of the exciter is suddenly increased by a relatively large amount. High speed "lower" contactor 8 has its contacts normally closed across an auxiliary resistance 9 in series with the rheostat 6 and when this contactor is energized it serves to insert the resistance 9 into the shunt field circuit of the exciter 5, thereby producing a relatively sudden and large decrease in the excitation produced by the exciter.

The motor operated rheostat 6 and the high speed contactors 7 and 8 are normally controlled by a power factor regulator indicated generally at 10. This regulator is of the general type described and claimed in Patent No. 1,848,852, granted March 8, 1932, on an application of L. W.

Thompson, and assigned to the assignee of the present invention. In the Thompson patent the regulator is illustrated as a voltage regulator, but the only difference between that regulator and the regulator as it is employed by us is that a power factor responsive operating means 11 is substituted for the three phase voltage responsive torque motor of the patent. The power factor responsive means 11 may be of any suitable well known type, as for example, a torque motor having windings corresponding to those of a quarter, or two phase induction motor. One of these windings is connected to be responsive to the current in one of the phases of the generator 1, by means of a current transformer 12, while the other winding is connected to be responsive to the potential of the generator 1, by means of the potential transformers 13 and an adjustable resistor 14. As shown, the current winding is connected to be responsive to the current in the middle phase, while the potential winding is connected to be responsive to the difference between the voltage of the middle phase and a voltage which is intermediate the voltage between the two outer phases. By adjusting the connection point on the resistor 14 the phase of the currents in the windings of the torque motor 11 may be adjusted. With the adjustable connection at the midpoint of the resistor 14, as shown, the currents in the voltage and current windings of the device 11 will be in phase with each other at unity power factor for generator 1. Consequently there will be no torque developed in the device 11 at unity power factor. As soon as the power factor departs from unity the current in one winding of the device 11 will have a quadrature component with respect to the current in the other winding and this quadrature component will produce a torque in the device 11, the direction of which is dependent upon whether the current is leading or lagging. By changing the point of connection on the resistance 14 the particular power factor which is held constant by the regulator may be adjusted because the regulator will tend to maintain zero phase angle between the currents in the windings of device 11.

The torque motor 11 is arranged to operate contacts which are identified respectively as the slow speed "raise" and "lower" contacts 15 and 16, and the high speed "raise" and "lower" contacts 17 and 18. Contacts 15 and 16 control a pair of "raise" and "lower" relays 19 and 20, respectively, which in turn control the direction of operation of the motor operated rheostat 6. The high speed "raise" and "lower" contacts 17 and 18 control the high speed "raise" and "lower" contactors 7 and 8, respectively. Contacts 15 and 16 cooperate with a common center contact 21 and contacts 17 and 18 cooperate with a common center contact 22, both of which are generally circular in shape and are rotated by means of a small motor 23 energized from one of the potential transformers 13. This rotation of center contacts 21 and 22, together with the rough periphery of the contact 21, provides automatic mechanical anti-hunting, or notching, of the regulator operation and also keeps the contact surfaces clean and free from sticking.

The voltage control means comprises any suitable voltage responsive means, such, for example, as a voltage regulating relay 24 which is connected to respond to the voltage of generator 1 through one of the potential transformers 13. This device also has in series therewith a resistor 25 which serves for recalibrating the relay 24 for a higher voltage when the circuit breaker 3 closes, as will be explained more in detail hereinafter. The voltage responsive device has a "raise" contact 26 and a "lower" contact 27, connected respectively to control relays 28 and 29. Relays 28 and 29 in turn, through certain interlocks which will be described in detail hereinafter, control, respectively, the "raise" and "lower" relays 19 and 20 for causing the corresponding raising and lowering operations of the motor operated rheostat 6. Relay 29, through a suitable interlock to be described hereafter, also controls the operation of the high speed "lower" contactor 8. The above-mentioned interlocks are controlled from the synchronizing means for machine 1. Such synchronizing means is well known in the art but as an understanding of its details is not necessary to an understanding of our invention and as it is relatively complicated, only that portion thereof which cooperates directly in our invention is illustrated in a simplified manner as a relay 63 which is controlled by a starting button 64. Button 64 may control relay 63 directly, as shown, or indirectly and by any well known supervisory control means. It is to be understood, however, that relay 63 is energized during the synchronizing period only, preferably after normal voltage has been attained preparatory to synchronizing, and that after switch 3 is closed relay 63 is deenergized. The latter operation can be made automatic by a set of interlock contacts 66 which break the circuit for relay 63 when switch 3 is closed.

A circuit controlled by a relay 31 and a switch 32, on the motor operated rheostat, is provided for automatically running the motor operated rheostat to a position corresponding to normal open circuit voltage of the generator 1, when it is cold, at a time when the system is shut down.

A transfer switch 33 is provided for controlling whether or not the system shall be under automatic control or manual control. When under manual control, the regulator operation is controlled by a hand operated "raise" or "lower" switch 34 for directly controlling the "raise" and "lower" relays or contactors 19 and 20.

In describing the operation of our invention the general operation will be described first and this will be followed by a detailed description of the operation in which all of the necessary circuits will be traced.

When switch 3 is open and it is desired to synchronize generator 1 with circuit 2 the voltage responsive device 24 will be in full control and the power factor regulator 10 will be incapacitated by means of auxiliary contacts 35 on switch 3, which are open when this switch is open. Thus, by means of relays 28 and 29 controlling relays 19 and 20, respectively, the voltage regulating relay 24 causes the motor operated rheostat 6 to vary the excitation of generator 1 until the voltage of the generator is normal and corresponds to the normal voltage of circuit 2. If switch 3 is now closed, the contacts 35 thereon close thereby putting the power factor regulator into control of the excitation varying means for the generator 1 and at the same time another set of auxiliary contacts 36 on the switch 3, which contacts normally short circuit the resistor 25 in series with the voltage regulating relay 24, are opened thereby inserting this resistance in the relay circuit. The effect of this insertion of resistance 25 is to recalibrate the relay for a higher voltage because as the resistance decreases the current in the relay, the relay acts as though the voltage is too low and consequently it will only balance in its mid-position at a higher voltage. The value of the resistance 25 controls the value of overvoltage at which the relay 24 will balance and, for example, this resistor may be so chosen that the relay 24 will only balance at a 10% overvoltage at times when the auxiliary contacts 36 of breaker 3 are open. The immediate effect of the closure of circuit breaker 3 on the voltage regulating relay 24 therefore, is to cause this device to close its "raise" contact 26. However, through normally open contacts 37 on the relay 63, the relay 28, which is controlled by the "raise" contact 26, is prevented from actuating the "raise" contactor 19. If now the voltage should attain a value more than 10% above normal, the voltage regulating relay will go to its "lower" position and engage its contact 27. However, as soon as it leaves the contact 26 relay 28 is de-energized whereby a set of contacts 38 thereon, in series with the auxiliary contacts 35 on switch 3, open and incapacitate the power factor regulator. When the voltage relay 24 closes "lower" contact 27, "lower" relay 29 is energized and the energization of this relay, causes the operation of the high speed "lower" contactor 8 and also causes the operation of the motor operated rheostat 6, through the lowering relay 20, in a direction to lower the excitation of the generator 1.

The detailed operation is as follows: If it is desired to regulate the system automatically the manually operated transfer switch 33 is moved to the right into its "automatic" position and the prime mover (not shown) for the generator 1, is started in any well known manner. Conventional synchronizing means (not shown) will control the speed of the prime mover, so that the frequency of the voltage generated by generator 1 will correspond substantially to the frequency of power circuit 2. The synchronizing means may be started and maintained in operation by starting button 64 which also will maintain relay 63 energized during the synchronizing operation. Voltage relay 24 is adjusted so that it will be in its balanced or midposition when the voltage of generator 1 is normal and corresponds with the normal voltage of circuit 2. If the voltage of the generator is too high, meter 24 engages its contact 27 thereby energizing relay 29. Energization of relay 29 causes the closure of a set of contacts 39 thereon which completes a circuit from the negative side of a suitable source of control current (not shown) through conductors 40, 41, then through the lowering relay 20 to a limit switch 42, operated by the motor operated rheostat, and thence to the opposite or positive side of the control source. Energization of the lowering relay 20 completes a circuit from the positive side of the control source through a set of contacts 43 and thence to the negative side of the control source through the driving motor for rheostat 6. This circuit contains a series field winding for the motor of rheostat 6 which causes the motor to turn in a direction such as to increase the resistance of rheostat 6 and thereby lower the voltage of the exciter 5 and hence the excitation and voltage of the generator 1 will be lowered. Similarly, if the voltage of generator 1 is too low the voltage relay 24 engages its "raise" contact 26 which completes a circuit from the positive side of the control source through the contacts 26 and through the operating winding of the relay 28 to the negative side of the control source. Energization of relay 28 causes closure of a set of contacts 44 which in turn completes a circuit from the negative side of the control source through the set of contacts 37, controlled by the relay 63, then through contacts 44 to the "raise" relay 19 and back to the other side of the control source through a limit switch 45. The operation of relay 19 causes closure of its contacts 46 which completes a circuit from the positive side of the control source through these contacts and through the motor to the negative side of the control source. This circuit, however, contains the other or reversing field winding for the motor of rheostat 6. This causes the motor to operate in the reverse direction so as to cut out more and more of resistance 6, thereby increasing the voltage of the exciter 5 which in turn increases the excitation and voltage of the generator 1. During synchronizing, the voltage responsive control means operates only the motor operated "raise" and "lower" means for the excitation and does not operate high speed contactors. This operation continues one way or the other until the voltage is normal when switch 3 can be closed either by manual means or by suitable well known conventional automatic means.

Closure of circuit breaker 3 causes auxiliary contacts 36 to open thereby connecting resistor 25 in series with the voltage relay and, as has already been explained, this causes this relay to act as though the voltage is too low or, in other words, to calibrate it for a higher voltage. Consequently, the voltage relay immediately closes its "raise" contacts 26 thereby energizing the relay 28 and causing it to close its contacts 38 and 44. The closure of the contacts 44 does not now energize the "raise" contactor 19 because the contacts 37, have been opened as a result of the opening of interlock contacts 66 during the closure of the circuit breaker 3. The closure of the contacts 38, combined with the closure of the contacts 35 on the circuit breaker 3, causes the power factor regulator 10 to be put in condition for operation, through the following circuit: From the negative side of the supply source through the right-hand contacts of the transfer switch 33 and thence through the contacts 38 and 35 in series to the regulator 10. The contacts 21 and 22 of the regulator 10 are now connected to the negative side of the source of supply current. If now the power factor is normal, for example unity, nothing happens. If the power factor is less than unity and the current is leading, a counter-clockwise torque is produced in the power factor responsive device 11 thereby causing contact 15 to engage contact 21. The circuit then continues through a conductor 47, through a set of contacts 48 controlled by the circuit breaker 3, and then through a conductor 49 to the "raise" contactor 19, operation of which causes the motor operated rheostat to raise the excitation of generator 1. If the power factor gets more than slightly below unity with leading current, the torque of device 11 is increased in a counter-clockwise direction causing contact 15 to flex and allow contact 17 to engage contact 22. A circuit is then completed from the negative side of the supply source to the contact 22, as already traced, and then through contact 17 directly to the high speed "raise" contactor 7 and then through a conductor 50 and the left-hand contacts of the transfer switch 33 to the positive side of the control source. Operation of the high speed "raise" contactor 7 causes the motor operated rheostat 6 to be short circuited whereby a relatively large increase in excitation of the generator is produced. This increasing of the excitation of generator 1 tends to reduce the phase angle of the leading current and to bring it more nearly to the normal or inphase position corresponding to the normal unity power factor to be regulated. When the power factor returns to normal the contacts 17 and 15 successively leave their cooperating contacts 22 and 21. If now the current is lagging instead of leading the torque of device 11 will be reversed and contact 16 will first engage contact 21, thereby completing a circuit from contact 21 through contact 16, a conductor 51, a set of contacts 52 on relay 29 and thence to conductor 40 from which the circuit is completed through lowering contactor 20 as already traced. This causes a reverse operation of the motor operated rheostat so as to lower the excitation of generator 1. If the current is very lagging the contact 16 will flex due to the increased torque of device 11 thereby causing contact 18 to engage contact 22 and this engagement completes a circuit from contact 18 through a conductor 53 to the high speed lowering contactor 8 which then inserts the resistance 9 in the exciter field circuit thereby abruptly lowering the excitation of generator 1 by a relatively large amount. This will cause the lagging current to swing into phase with the voltage of the generator 1 and as this takes place the contacts 18 and 16 will successively leave their contacts 22 and 21 and when contact 16 leaves contact 21 the power factor will be normal and changes in excitation will cease.

The function of contacts 48 and 52 is to prevent objectional back circuits through the power factor regulator at times when this regulator might accidentally be forced over to one or the other of its contact making positions when the circuit breaker 3 is open and the generator 1 is shut down.

If now the voltage of generator 1 should exceed its normal value by more than some arbitrarily predetermined amount, such for example at 10%, the voltage control relay 24 will be energized sufficiently to cause it to break connection at contact 26 and make connection at contact 27. Breaking the connection at contact 26 deenergizes relay 28 and when its contacts 38 open the power factor regulator 10 becomes deenergized and incapacitated for regulating operation. Making contact at 27 energizes the lowering relay 29 which then closes its contacts 39. This completes a circuit from the negative side of the supply source through conductors 40, 41, etc., to the lowering contactor 20, as already described. This causes the motor operated rheostat 6 to operate in a direction to reduce the excitation and voltage of generator 1. Simultaneously with this operation, a set of contacts 54 on relay 29 close and this completes a circuit, through a set of contacts 55 controlled by relay 63, from the negative side of the supply source through sets of contacts 55 and 54 in series, a conductor 56, a conductor 53 and thence to the high speed lowering contactor 8. Consequently, over voltage conditions cause operation simultaneously of both the low and high speed lowering means for the excitation of generator 1.

When it is desired to shut down the generator 1 the circuit breaker 3 is opened and as this opens the auxiliary contacts 35 the power factor regulator is taken out of service. The voltage regulating relay 24 will prevent the open circuit voltage of the generator 1 from exceeding normal after switch 3 opens. However, at shut down the various generator coils will be relatively hot and the regulating resistor will be adjusted for other than no-load normal voltage so that the position the motor operated rheostat is left in will not correspond to the normal open circuit voltage with the parts cold. This situation is taken care of by means of the switch 32 and the relay 31. Thus, if the motor operated rheostat is in a position corresponding to a lower value of resistance than is required for normal open circuit voltage, with the parts cold, switch 32 will be closed and this will complete a circuit from the positive side of the supply source through the switch 32 and through the relay 31 and its contacts 57 to the negative side of the supply source. The relay 31 is immediately picked up thereby opening its contacts 57 but a holding circuit is maintained through a resistor 58. Operation of the relay 31 also causes it to close another set of contacts 59 which completes a circuit from the negative side of the control source through a set of contacts 62 which are closed when the circuit breaker 3 is open, a set of contacts 65 which are closed when relay 63 is deenergized, a conductor 60, the contacts 59, a conductor 61, the conductor 41, the lowering contactor 20 and the limit switch 42 to the other side of the supply source. This causes the motor operated rheostat to turn in a direction to increase its resistance until it has a value corresponding to the normal open circuit voltage of the generator when it is cold. When this is attained switch 32 opens, thereby deenergizing relay 31 and stopping the motor.

By having contacts 37 closed only during synchronizing, the voltage relay 24 can only raise the excitation during this period. This is necessary for two reasons. The first is that during normal operation the system should be power factor controlled. Due, however, to the recalibrating effect of resistor 25 relay 24 is trying to raise the voltage. Hence, it is necessary for contacts 37 to be open during normal operation. The second reason is that on shut down, after switch 3 is opened and the generator 1 comes to rest, the relay 24 will try to maintain voltage by running the motor operated rheostat to its maximum "raise" position. This, obviously, would conflict with the operation of switch 32 and relay 31.

By having contacts 55 remain closed after switch 3 is opened proper overvoltage protection by the operation of the high speed lowering contactor 8 is insured at times when the switch 3 is opened because of overvoltage or overspeed.

By having contacts 62 and 65 in series the automatic run-back circuit is prevented from interfering with the normal operation. Thus, as contacts 65 are open during synchronizing the voltage relay 24 can raise the voltage without interference by the switch 32 and its controlled circuit while by having contacts 62 open during normal operation the proper control of voltage and power factor is not interfered with by the run-back circuit.

If it is desired to control the motor operated rheostat manually the transfer switch is thrown to the left and then manual control of the switch 34 will directly operate the "raise" and "lower" relays 19 and 20 for operating the rheostat 6.

While we have shown and described a particular embodiment of our invention, it will be obvious to those skilled in the art that changes and modifications may be made without departing from our invention and we therefore aim in the appended claims to cover all such changes and modifications as fall within the true spirit and scope of our invention.

What we claim as new and desire to secure by Letters Patent of the United States is:

1. In combination, a dynamo-electric machine, a regulator for said machine of an operating condition thereof other than voltage, and overvoltage responsive means for incapacitating said regulator and preventing further increase in the voltage of said machine in response to the attainment of a predetermined overvoltage.

2. In combination, an alternator, slow and fast means for raising and lowering the excitation of said alternator, a power factor regulator for controlling said excitation varying means, and alternator overvoltage responsive means for incapacitating said regulator and controlling the slow and fast excitation lowering means.

3. In combination, a normally substantially constant potential alternating current circuit, a synchronous generator, a switch for connecting said generator to said circuit, automatic voltage control means for said generator, means operative during the synchronizing period of said generator for causing said control means to regulate the voltage of said generator to a voltage corresponding to the voltage of said circuit, and means operative in accordance with the closing of said switch at the end of said synchronizing period for recalibrating said voltage control means for a higher voltage and preventing said control means from raising the voltage of said generator whereby said voltage control means becomes an overvoltage protective means for reducing the generator voltage if it exceeds said higher voltage.

4. In combination, an alternating current circuit, a synchronous generator, a switch for connecting said generator to said circuit, a power factor regulator for said generator, a generator voltage responsive relay, means for incapacitating said power factor regulator when said switch is open and for causing said relay to regulate the voltage of said generator for synchronizing purposes, means controlled when said switch is closed for recalibrating said relay for a higher voltage, for preventing said relay from raising the voltage of said generator and for causing said regulator to regulate the power factor of said generator, and means controlled by said relay when the voltage of said generator attains a predetermined overvoltage for incapacitating said regulator and reducing the voltage of said generator.

5. In combination, an alternating current circuit, an alternator, a switch for connecting said alternator to said circuit, means including relatively slow acting and relatively quick acting means for raising and lowering the excitation of said alternator, a power factor regulator for said alternator for controlling said excitation varying means, a voltage regulating relay connected through a resistor to respond to the voltage of said alternator, means controlled by said switch when it is open for incapacitating said regulator and for short circuiting said resistor, means controlled by said relay for normally controlling only the relatively slow acting means for raising and lowering the excitation of said alternator so as to regulate its voltage to correspond to that of said circuit, means for preventing said relay from controlling the relatively quick acting excitation controlling means, means controlled by the closing of said switch for removing the short circuit around said resistor whereby said contact making voltmeter tends to cause said excitation controlling means to increase the excitation of said machine, means controlled when said switch is closed for preventing the relay from controlling the excitation raising means, means jointly controlled by the closing of said switch and said relay when it is attempting to control the excitation raising means for putting said power factor regulator into operation, and means controlled by said relay when the voltage of said generator exceeds a predetermined high value for incapacitating said regulator and for causing operation of the relatively slow and quick acting excitation lowering means, the quick acting excitation lowering means being out of the control of the relay only during the synchronizing period of the generator.

6. In combination, a dynamo electric generator, a motor operated rheostat for controlling the excitation of said generator, automatic run-back means for preventing said rheostat from remaining in a position corresponding to a value of excitation which would cause the open circuit voltage of said generator when it is cold to exceed a normal value, regulating means for controlling said rheostat, and means operative when conditions require the operation of said regulating means for incapacitating said run-back means.

HERMAN BANY.
ROBERT N. SLINGER.